United States Patent [19]

Metil

[11] 4,267,236

[45] May 12, 1981

[54] ALLOYS OF EPOXY AND HOMOPOLYMERS OF FURFURYL ALCOHOL

[76] Inventor: Ignatius Metil, 364 Whitfield Ave., Buffalo, N.Y. 14220

[21] Appl. No.: 65,086

[22] Filed: Aug. 9, 1979

[51] Int. Cl.$^3$ .................... B05D 3/02; B32B 15/08; B32B 27/38

[52] U.S. Cl. .................... 428/413; 427/386; 427/388.2; 427/393.6; 428/418; 428/451; 525/117

[58] Field of Search .............. 427/385 C, 386, 388 A, 427/388.2, 393.6; 428/413, 417, 418, 538; 525/117

[56] References Cited

U.S. PATENT DOCUMENTS 3,301,918  1/1967  Dereich ........................... 525/117

OTHER PUBLICATIONS

*Stable Furfuryl Alcohol Impregnating Solutions,* Goldstein, Irving S. et al., Jan., 1960.

*Primary Examiner*—Michael R. Lusignan
*Attorney, Agent, or Firm*—Bean, Kauffman & Bean

[57] ABSTRACT

A mixed resin system is disclosed which, when cured by a crosslinking agent which is a polyfunctional amine or amide, yields a tough, flexible product having excellent chemical resistance and high temperature resistance as well as the ability to adhere well to virtually any substrate incuding metals and Portland cement or concretes based thereon. The resin system is a mixture of furfuryl alcohol homopolymer and epoxy resin in various weight ratios dependent upon the physical properties desired.

8 Claims, No Drawings

ALLOYS OF EPOXY AND HOMOPOLYMERS OF FURFURYL ALCOHOL

BACKGROUND OF THE INVENTION

This invention relates to resin systems particularly adapted for use as corrosion-resistant coatings on a wide variety of materials or substrates.

Homopolymers of furfuryl alcohol are known to be excellent for use as corrosion-resistant coatings having, when cured, a wide range of chemical resistance such as renders them suitable for service in non-oxidizing acids, alkalies, salts, gases, oils, greases, detergents and most solvents at temperatures up to 375° F.

The principal drawbacks of such coatings are that they are brittle, do not adhere to steel, aluminum, copper or any other metal, and cannot be used on alkaline materials, such as concrete, due to the requirement for acidic curing agents in connection with these resins. As a result, coatings and cements based on homopolymer of furfuryl alcohol are restricted in use principally to wood and ceramic materials.

Another drawback of acid cured homopolymers of furfuryl alcohol is the high degree of shrinkage and high porosity incidental to the loss of water as by-product of the condensation reaction during cure. However, despite the above limitations, furfuryl alcohol homopolymers when cured have considerable commercial importance as corrosion-resistant coatings and cement.

Epoxy resins, on the other hand, are noted for their low shrinkage during cure, since epoxy resins react with very little rearrangement and ordinarily with no volatile by-products being evolved. Also, unlike the above mentioned homopolymers of furfuryl alcohol, epoxy resins may be cured with a wide range of agents including acid curing agents such as carboxylic acid anhydrides, dibasic organic acids, phenols and Lewis acids, and basic curing agents such as Lewis bases, inorganic bases, primary and secondary amines and amides. Epoxy resins, due also to their low shrinkage during cure, are capable of strongly adhering to virtually any substrate.

Epoxy polymers, when cured, also exhibit reasonable chemical resistance. Because of the carbon-to-carbon or ether linkages within the epoxy resin molecule, these resins are extremely stable to the reaction of alkalies and have reasonable resistance to most acids and many solvents. Generally speaking, the chemical resistance is dependent upon the curing agent and the degree of cure.

However, cured epoxy resins are inferior to cured homopolymers of furfuryl alcohol in regard to chemical resistance and to high temperature resistance. In regard to the latter, cured epoxy resins tend to become brittle at high temperatures.

BRIEF SUMMARY OF THE INVENTION

The present invention is based upon the discovery that a mixture of homopolymer of furfuryl alcohol and epoxy resin can be crosslinked by the use of polyamide or polyamine curing agents and that the reactivity of the curing agent is significantly enhanced by the presence of the homopolymer of furfuryl alcohol even when the curing agent is not effective to cure this resin alone. This is dramatically illustrated by the fact that a polyfunctional amine or amide curing agent for the epoxy resin, when used in amount insufficient to cure a specific amount of epoxy resin alone, nevertheless will effect crosslinking of the same amount of resin when it consists of a mixture of homopolymer of furfuryl alcohol and epoxy resin. Similarly, the same curing agents when used in greater amounts sufficient to effect progressively greater curing of the epoxy resin alone, allow the characteristics of flexibility and hardness to be controlled to yield a wide range of highly chemical- and high temperature-resistant alloys to be obtained.

Generally speaking, as little as 10% homopolymer of furfuryl alcohol and as much as 90% of this homopolymer in the homopolymer/epoxy resin mixture yield useful products, although it is somewhat easier in most cases to obtain the desired balance of hardness and flexibility when the weight ratio is in the range of about 30/70–70/30.

Again, it is the case in general that for a given weight ratio of furfuryl alcohol homopolymer/epoxy, as the relative amount of curing agent is increased, the cured resin alloys progress first from soft, extremely flexible products, then to relatively hard, though still flexible products, then to very hard, relatively inflexible products, and finally back to softer and more flexible products. In the latter stage, the curing agent is in excess and acts as a plasticizing diluent.

The resin system of this invention is a furfuryl alcohol homopolymer/epoxy system crosslinked with a polyfunctional amine or amide. The physical characteristics of hardness and flexibility of the cured material are controlled by the weight ratio of the two resins and the degree of cure effected (obtained by the amount of curing agent used and/or the conditions of cure) without significant effect on the chemical and temperature resistance properties. Surprisingly, despite the inherent brittleness of cured furfuryl alcohol homopolymer alone and the high temperature embrittlement of cured epoxy polymers alone, the combined system of this invention can exhibit a high degree of toughness, flexibility and adhesiveness at room temperature and retain the majority of these properties even at temperatures of 400° F. and greater.

DETAILED DESCRIPTION OF THE INVENTION

In order to understand this invention from a point of view of mechanism reaction, the simplified molecular structures of the reactive species are presented as follows:

furfuryl alcohol polymer

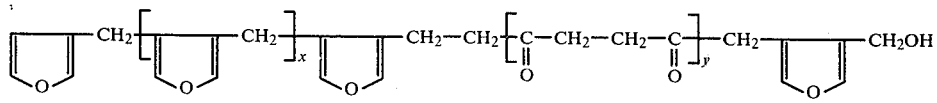

Epoxy polymer (bisphenol A-type)

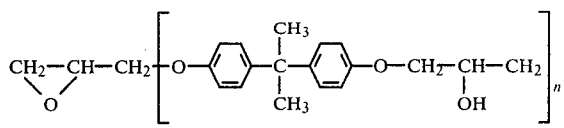

polyamine

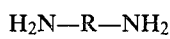

The polyfunctional amine crosslinks with the epoxy as well as the homopolymer by means of its active hydrogens, as follows:

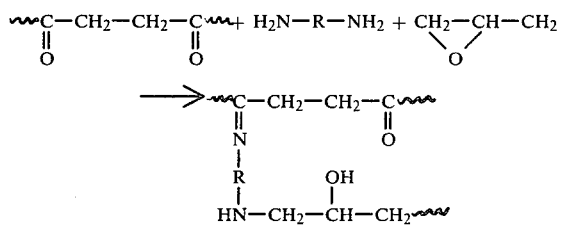

EXAMPLE I

Furfuryl alcohol homopolymer obtained from Hooker Chemical Corporation, Durez Division was blended with various portions of Epon 828, an epoxy resin produced by Shell Chemicals and Versamid 125, polyamide resin manufactured by General Mills.

After thoroughly mixing 100 grams of resin and 3 grams Versamid with spatula, patties (15 grams each) were prepared by placing the material in an aluminum dish 2⅜" in diameter and ⅜" deep and left for 10 days at room temperature. The degree of cure is related to the weight ratio of epoxy and furfuryl alcohol homopolymer as listed in Table I.

TABLE I

| Resin by Weight | | |
|---|---|---|
| homopolymer | Epoxy | Degree of Cure |
| 100 | 0 | soft, uncured |
| 90 | 10 | gel |
| 80 | 20 | gel |
| 70 | 30 | soft, some cure |
| 60 | 40 | soft, some cure |
| 50 | 50 | softer, slight cure |
| 30 | 70 | softer, slight cure |
| 10 | 90 | softer, slight cure |
| 0 | 100 | tacky, uncured |

Table I clearly indicates that in amounts insufficient to effect, after 10 days, room temperature cure of epoxy alone, the polyfunctional amide is effective nevertheless to achieve varying degrees of cure provided the weight ratio of homopolymer to epoxy of the alloy is about in the range of 30/70 to 70/30.

If the degree of cure is increased by introducing a high temperature cure regime, useful products exhibiting excellent corrosion resistance and high temperature resistance and, in most cases, a high degree of flexibility can be obtained, as illustrated in Example II.

EXAMPLE II

The formulation of Example I was repeated and samples were prepared by application of the different resin combinations at 55 mils film thickness on steel panels, 1½"×6", cleaned by aluminum oxide blasting. The samples were cured for 44 hours at room temperature followed by 4 hours at 140° F. After 1 hour cooling, they were deformed around a 1" bar or mandrel. In the following Table, the product was considered to pass the flexibility test if the resin alloy remained bonded on the substrate and was considered to fail if cracks appeared with or without partial or complete disbonding of the resin alloy from the substrate:

TABLE II

| Resin by Weight | | |
|---|---|---|
| homopolymer | Epoxy | flexibility test |
| 90 | 10 | passed |
| 80 | 20 | passed |
| 70 | 30 | passed |
| 60 | 40 | passed |
| 50 | 50 | passed |
| 40 | 60 | passed |
| 30 | 70 | passed |
| 20 | 80 | failed |
| 10 | 90 | failed |
| 0 | 100 | failed |

As is illustrated by the brittleness of the 100% epoxy sample in Table II, the high temperature cure regime significantly increased the degree of cure compared with Example I. The 20/80 and 10/90 samples also cured to brittleness whereas all of the products in the range 10/90 to 30/70 were flexible.

EXAMPLE III

In this example, the furfuryl alcohol homopolymer and epoxy resins of Example I were used but the curing agent Versamid 125 was increased to 35 grams per 100 grams of resin and 3 grams of Calidria asbestos, RG-244 sold by Union Carbide was also added as filler. After thorough mixing by spatula, two 30 gram patties were cast in an aluminum dish and were allowed respectively to cure at room temperature for 48 hours (sample A) and at room temperature for 44 hours followed by 4 hours at 140° F. (sample B), after which their hardness (durometer hardness, type D) was tested as follows:

TABLE III

| Resin by weight | | Hardness, Shore D | |
|---|---|---|---|
| homopolymer | Epoxy | Sample A | Sample B |
| 100 | 0 | 7 | 10 |
| 90 | 10 | 5 | 5 |
| 80 | 20 | 5 | 7 |
| 70 | 30 | 7 | 10-15 |
| 60 | 40 | 15 | 15-20 |
| 50 | 50 | 25-30 | 40-45 |
| 40 | 60 | 50 | 65-70 |
| 30 | 70 | 55-60 | 60 |
| 20 | 80 | 70 | 55-65 |
| 10 | 90 | 60 | 70 |
| 0 | 100 | 50-55 | 75 |

In this Example, the effect of increased cure both by increased amount of curing agent and high temperature curing is evident. Certain trends related to weight ratio of the alloy constituents and degree of cure are evident from Table III, and these hold true in general for the resin systems of this invention. Thus with reference to samples A, it is in general always possible to obtain a cured, relatively soft and highly flexible product toward the higher end of the weight ratio range of 90/10 to 10/90; relatively harder but still highly flexible products are obtained at somewhat lower ratios; the hardness increases with decreased flexibility, usually peaking at some particular value (see 20/80, samples A), followed by decreasing hardness (10/90, samples A). This last may be followed by another increase in hardness (see the range 40/60–10/90, samples B). However, as is illustrated in Table II, it is always the case that if brittleness is reached at some value of alloy constituents weight ratio, products of still lower weight ratio will also be brittle, given the same degree of cure. Thus, both the weight ratio and the degree of cure can be controlled to tailor the properties of hardness and flexibility over a wide range to suit particular requirements.

EXAMPLE IV

Generally speaking, it is easier to tailor the characteristics of the end product within the weight ratio range of about 30/70 to about 70/30. To illustrate, six samples were prepared from either a 70/30 furfuryl alcohol homopolymer Epon 828 mixture (samples, C, D and E) or a 30/70 mixture (samples F, G and H), with varying amounts of curing agent Versamid 125. Samples C and F were prepared using 13 parts Versamid 125 per 100 parts resin mixture; samples D and G were prepared using 35 parts Versamid per 100 parts resin; and samples E and H were prepared using 100 parts Versamid 125 per 100 parts resin. Hardness (Shore D where applicable) was tested for each sample after 3, 7 and 14 days cure at room temperature, as follows:

TABLE IV

| Sample | Resins Ratio | Hardness | | |
|---|---|---|---|---|
| | | 3 days | 7 days | 14 days |
| C | 70/30 | 8 | 15 | 29 |
| D | 70/30 | 28 | 29 | 33 |
| E | 70/30 | 8 | 8 | 9 |
| F | 30/70 | soft,foamy | 22 | 39 |
| G | 30/70 | 55 | 64 | 64 |
| H | 30/70 | 63 | 63 | 64 |

Comparison between Samples C–E and Samples F–H shows that the amount of curing agent affects the hardness (or the flexibility) less when a greater amount of furfuryl alcohol homopolymer is present in the alloy. Samples E and H illustrate that the amount of curing agent reaches an "excess" amount more rapidly in the presence of greater amounts of homopolymer in the alloy and acts, when present in "excess", as a plasticizing diluent. This effect is probably due to the much greater number of reactive sites present in the epoxy resin and indicates that the crosslinking mechanism is complex.

EXAMPLE V

In this Example, the curing agent used was diethylenetriamine (DETA). In Table Va 13 parts DETA were used per 100 parts resin mixture (resins as in Example I), as follows:

TABLE Va

| Resins Ratio | Hardness, Shore D where applicable | | |
|---|---|---|---|
| | 3 days | 7 days | 14 days |
| 100/0 | v.soft,sticky | v.soft | soft |
| 80/20 | soft,sticky | gelled | gelled |
| 20/30 | 5 | 6 | 6 |
| 60/40 | foamy | — | — |
| 30/70 | very foamy | — | — |
| 20/80 | foamy | | |
| 0/100 | 58 | 64 | 64 |

The amount of DETA was reduced to 8 parts DETA per 100 parts resin, and aluminum panels coated as in Example II, with the following results:

TABLE Vb

| Resins Ratio | Hardness, Shore D where applicable | | |
|---|---|---|---|
| | 3 days | 7 days | 14 days |
| 100/0 | v.soft,sticky | v.soft | same |
| 80/20 | gelled | same | same |
| 60/40 | 29 | 35 | 38 |
| 20/80 | 69 | 71 | 66 |
| 0/100 | 64 | 62 | 63 |

The coated panels of Table Vb, after 14 days cure at room temperature were subjected to the mandrel test of Example II with the following results:

TABLE Vc

| Resins ratio | mandrel test results |
|---|---|
| 80/20 | soft, no cracks |
| 60/40 | no cracks or disbonding |
| 20/80 | cracked and completely disbonded |
| 0/100 | many cracks, no disbonding |

Following Example IV, four patty samples were prepared in which samples I and J consisted of a 70/30 mixture of homopolymer/epoxy cured at room temperature respectively with 13 and 35 parts DETA per 100 parts resin mixture, and samples K and L consisted of a 30/70 mixture of homopolymer/epoxy cured at room temperature respectively with 13 and 35 parts DETA per 100 parts resin. Hardness was tested with the following results:

TABLE Vd

| Sample | Resins ratio | Hardness,Shore D where applicable | | |
|---|---|---|---|---|
| | | 3 days | 7 days | 14 days |
| I | 70/30 | 5 | 6 | 6 |
| J | 70/30 | v.soft | same | gelled |
| K | 30/70 | v.foamy | same | same |
| L | 30/70 | 10 | 8 | 8 |

EXAMPLE VI

In this Example, the homopolymer of furfuryl alcohol and epoxy resins of Example II were crosslinked with an aromatic amine in amount of 50 parts per 100 parts resin mixture. The aromatic amine was Ancamine LT, available from Pacific Anchor Chemical Corporation, Richmond, Calif.

The indicated weight ratios of the resins were applied to aluminum substrates, as in Example II, and tested for hardness and adhesion to the substrate after mandrel based test, as follows:

TABLE VI

| Resins ratio | Hardness | | | adhesion,mandrel test |
|---|---|---|---|---|
| | 3days | 7days | 14days | |
| 100/0 | v.soft | soft | soft | — |
| 80/20 | gell | same | same | no cracks or disbonding |
| 60/40 | 13 | 18 | 18 | no cracks or disbonding |
| 20/80 | 65 | 76 | 79 | cracked,complete disbonding |
| 0/100 | 69 | 78 | 78 | cracks,no disbonding |

The above Examples demonstrate that the physical characteristics of flexibility and hardness in a corrosion-resistant coating can be controlled by varying the weight amount of furfuryl alcohol homopolymer used in the resin mix and/or by varying the amount or type of curing agent employed. Generally speaking, the coating must first of all be self-supporting whereby to preserve its integrity. If considerations of flexibility and hardness are not of particular concern, a wide range of choice both in weight ratio of resin components and in amount of curing agent and/or cure regime is available. If, on the other hand, either one or both of flexibility and hardness is a factor which must be considered, the weight ratio of resin components and the amount of curing agent and/or cure regime must be selected to provide the desired flexibility and/or hardness characteristics.

What is claimed is:

1. An article comprising a structure having thereon a temperature- and corrosion-resistant cured coating which adheres to various substrates including metals and concrete, which coating consists essentially of an intimate mixture of homopolymer of furfuryl alcohol and epoxy resin cured with an agent selected from the group consisting of polyfunctional amines and amides, said homopolymer being present in weight ratio with respect to the epoxy resin in the range 10/90 to 90/10, to provide the cross-linking necessary to make the cured coating self-supporting.

2. An article comprising a structure having thereon a temperature- and corrosion-resistant cured coating which adheres to various substrates including metals and concrete, which coating consists essentially of an intimate mixture of homopolymer of furfuryl alcohol and epoxy resin cured with an agent selected from the group consisting of polyfunctional amines and amides, said homopolymer being present in weight ratio with respect to the epoxy resin in the range 30/70 to 70/30 to provide the cross-linking necessary to make the cured coating self-supporting.

3. A two-component coating system which comprises, as a first component, a mixture of homopolymer of furfuryl alcohol and epoxy resin in weight ratio of from 10/90 to 90/10, and, as a second component, a curing agent for said first component, said curing agent being selected from the group consisting of polyamines and polyamides.

4. A coating system as defined in claim 3 wherein said first component contains said homopolymer and said epoxy in weight ratio range of 30/70 to 70/30.

5. The method of producing a coating on a substrate which may be a metal or an alkaline material such as concrete, which comprises the steps of:
 (a) providing a resin mixture consisting essentially of homopolymer of furfuryl alcohol and epoxy resin in weight ratio of homopolymer to epoxy of from 10/90 to 90/10;
 (b) mixing the resin mixture of step (a) with a curing agent selected from the group consisting of polyamines and polyamides;
 (c) applying the mixture of step (b) to the substrate and effecting cure of such mixture.

6. The method of producing a coating on a substrate which may be a metal or an alkaline material such as concrete, which comprises the steps of:
 (a) providing a resin mixture consisting essentially of homopolymer of furfuryl alcohol and epoxy resin in weight ratio of homopolymer to epoxy of from 30/70 to 70/30;
 (b) mixing the resin mixture of step (a) with a curing agent selected from the group consisting of polyamines and polyamides;
 (c) applying the mixture of step (b) to the substrate and effecting cure of such mixture.

7. A cured, flexible resin alloy which comprises a cross-linked product of from 10/90–90/10 weight ratio of homopolymer of furfuryl alcohol and epoxy resin.

8. An article comprising a structure having thereon a corrosion-resistant coating possessing the characteristics of toughness and flexibility up to temperatures in the order of 400° F. and greater, which coating consists essentially of an intimate mixture of epoxy resin and homopolymer of furfuryl alcohol crosslinked with an agent selected from the group consisting of polyfunctional amines and amides, in which the homopolymer and epoxy resin are present in weight ratio of about 30/70 to about 70/30.

* * * * *